United States Patent [19]
Katayama et al.

[11] Patent Number: 5,416,606
[45] Date of Patent: May 16, 1995

[54] METHOD AND APPARATUS FOR ENCODING OR DECODING AN IMAGE IN ACCORDANCE WITH IMAGE CHARACTERISTICS

[75] Inventors: Akihiro Katayama, Kawasaki; Yasuhiko Yasuda, Musashino; Shigeo Kato, Saitama, all of Japan

[73] Assignee: Canon Kabushiki Kaisha, Tokyo, Japan

[21] Appl. No.: 311,730

[22] Filed: Sep. 23, 1994

Related U.S. Application Data

[63] Continuation of Ser. No. 631,145, Dec. 20, 1990, abandoned.

[30] Foreign Application Priority Data

Dec. 21, 1989 [JP] Japan .................................. 1-333836

[51] Int. Cl.⁶ .............................................. H04N 1/40
[52] U.S. Cl. ...................................... 358/467; 358/426; 358/432; 358/433; 358/447; 358/539; 358/540; 358/455; 382/232
[58] Field of Search ............. 358/467, 426, 429, 261.1, 358/447, 455, 456, 427, 262.1, 445, 539, 538, 520, 432, 433; 382/56, 54

[56] References Cited

U.S. PATENT DOCUMENTS

| | | | |
|---|---|---|---|
| 4,266,249 | 5/1981 | Chai et al. ............................ | 358/260 |
| 4,797,945 | 1/1989 | Suzuki et al. ........................ | 382/56 |
| 4,887,151 | 12/1989 | Wataya .............................. | 358/80 |
| 4,903,317 | 2/1990 | Nishihara et al. ................... | 382/56 |
| 4,974,071 | 4/1991 | Maeda ............................... | 358/80 |
| 5,023,919 | 6/1991 | Yoshida et al. ..................... | 382/54 |
| 5,038,389 | 8/1991 | Mizuno ............................... | 358/433 |
| 5,048,112 | 9/1991 | Alves et al. ........................ | 358/433 |

FOREIGN PATENT DOCUMENTS

| | | |
|---|---|---|
| 0283715 | 2/1988 | European Pat. Off. . |
| 60-221773 | 4/1987 | Japan . |
| 63-045684 | 2/1988 | Japan . |
| 63-306768 | 12/1988 | Japan . |
| 37368 | 5/1992 | Japan .............. H04N 1/41 |
| 236574 | 1/1993 | Japan .............. H04N 1/41 |
| 322562 | 3/1993 | Japan .............. H04N 1/41 |
| 2163026 | 2/1986 | United Kingdom . |
| 2205704 | 12/1988 | United Kingdom . |
| 2219114 | 11/1989 | United Kingdom . |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

The invention relates to an image processing apparatus having the function to encode or decode image data and discloses a technique in which an optimum encoding method is selected in accordance with the characteristics of an image and a high efficient encoding with little deterioration in image is executed.

47 Claims, 9 Drawing Sheets

FIG. 3

| 4 ↓ | | |
|---|---|---|
| A | A | A |
| A | B | B |

| 0 0 0 0<br>0 0 0 0<br>0 0 0 0<br>0 0 0 0 | 0 0 0 0<br>0 0 0 0<br>0 0 0 0<br>0 0 0 0 | 0 0 0 0<br>0 0 0 0<br>0 0 0 0<br>0 0 0 0 |
|---|---|---|
| 0 0 0 0<br>0 0 0 0<br>0 0 0 0<br>0 0 0 0 | 0 0 0 0<br>0 0 1 1<br>0 1 1 0<br>0 1 1 0 | 0 0 0 0<br>0 0 1 1<br>0 1 1 0<br>0 1 1 0 |

FIG. 7

| 4 | 2 | 3 | 6 |
|---|---|---|---|
| 2 | 3 | 4 | 7 |
| 3 | 4 | 8 | 9 |
| 6 | 7 | 9 | 10 |

FIG. 8

| 20 | 10 | 5 | 1 |
|----|----|---|---|
| 10 | 9  | 3 | 2 |
| 3  | 3  | 2 | 1 |
| 1  | 2  | 1 | 1 |

FIG. 9

| 5 | 5 | 1 | 0 |
|---|---|---|---|
| 5 | 3 | 0 | 0 |
| 1 | 0 | 0 | 0 |
| 0 | 0 | 0 | 0 |

FIG. 10

| 20 | 10 | 3 | 0 |
|----|----|---|---|
| 10 | 9  | 0 | 0 |
| 3  | 0  | 0 | 0 |
| 0  | 0  | 0 | 0 |

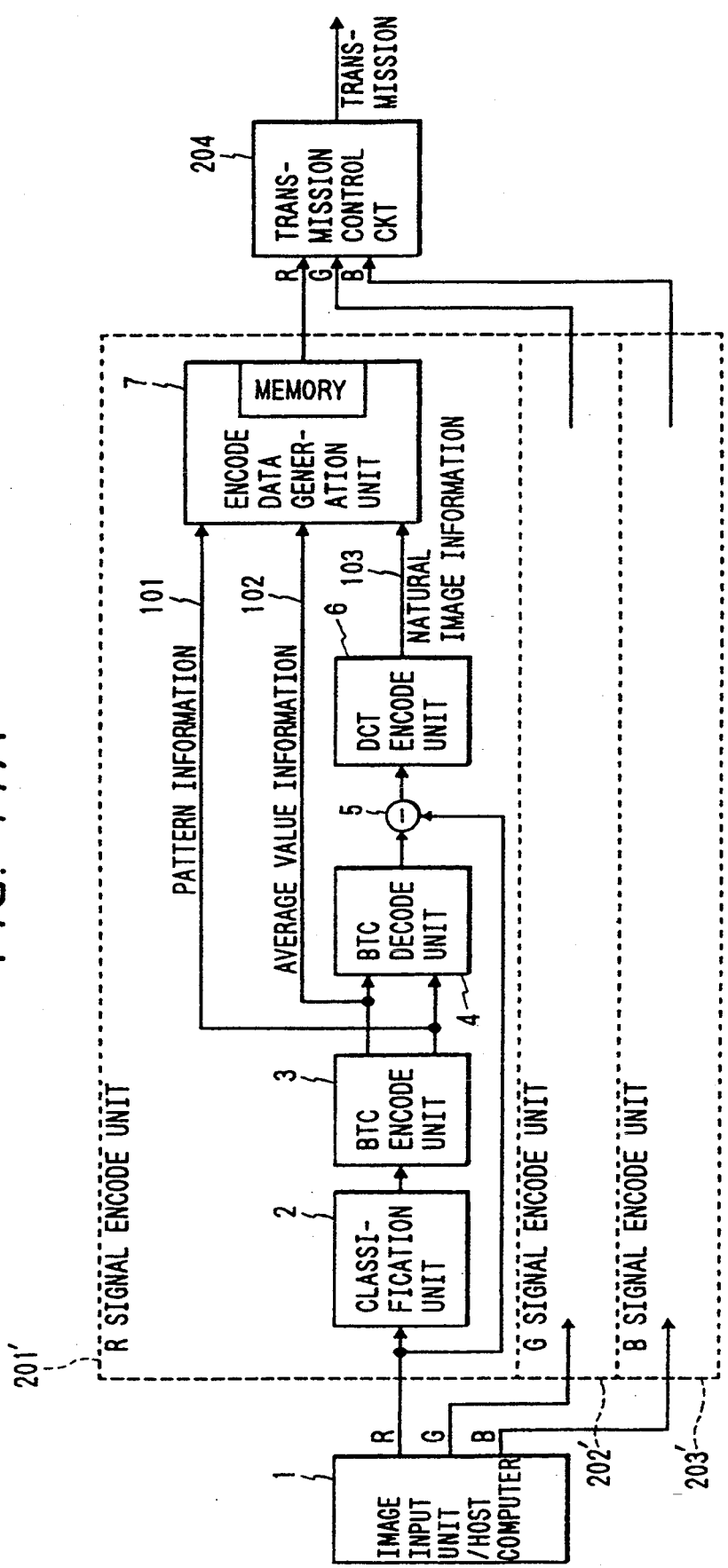

METHOD AND APPARATUS FOR ENCODING OR DECODING AN IMAGE IN ACCORDANCE WITH IMAGE CHARACTERISTICS

This application is a continuation of application Ser. No. 07/631,145, filed Dec. 20, 1990, now abandoned.

BACKGROUND OF THE INVENTION

1. Field of the Invention

The present invention relates to an image processing apparatus which is used in a facsimile communication, an image data base, or the like.

2. Related Background Art

In recent years, as a method of encoding a natural image (multivalue color image), there has been proposed a method whereby an image is divided into blocks each comprising a plurality of pixels, a DCT (discrete cosine transform) is executed for each block, a coefficient of the DCT is quantized, and a Huffman code is assigned.

However, in the above conventional method, since a high frequency portion of the DCT coefficient is roughly quantized in order to raise the encoding efficiency, a ringing occurs in an edge portion of a reproduction image, particularly, in a portion of a character and a blur of the peripheral portion of the character remarkably deteriorates the quality of image.

Such a problem is not limited to the encoding method as mentioned above but also similarly occurs in other encoding methods such as orthogonal transformation encoding, vector quantization, and the like.

On the other hand, techniques for extracting an edge component and executing an encoding according to the extracted edge component have been proposed by the same assignee of the present application in U.S. Pat. Nos. 4,797,945 and 4,887,151 and U.S. patent application Ser. Nos. 185,024, 261,276, 312,755, and 362,014, now U.S. Pat. No. 5,089,884.

In addition, a technique for executing a process according to an edge component when encoded image data is decoded has been proposed by the same assignee of the present application in U.S. patent application Ser. No. 146,084, now U.S. Pat. No. 5,023,919.

However, the further improvement is demanded to solve the above problems and to improve both of the encoding efficiency and the reproducibility of the image.

SUMMARY OF THE INVENTION

It is, therefore, an object of the invention to solve the above problems and to provide an image processing apparatus which can prevent a deterioration in image quality when executing the encoding or decoding.

Another object of the invention is to prevent the occurrence of the ringing as mentioned above and to also improve an image quality when an image including characters were reproduced.

To accomplish the above object, according to the invention, there is provided an image encoding apparatus comprising:

a) input means for inputting image data;

b) discriminating means for discriminating whether the image data which was input by the input means is edge data or not; and c) encoding means for encoding the image data which was input by the input means by a different encoding method in accordance with the result of the discrimination by the discriminating means.

According to the invention, there is also provided an image decoding apparatus comprising:

a) input means for inputting image data which was encoded by a plurality of different methods and edge data of the image data;

b) decoding means for decoding the image data in accordance with the edge data; and c) output means for outputting the image data which was decoded by the decoding means.

On the other hand, further another object of the invention is to provide an image processing apparatus which can efficiently transmit a color image.

To accomplish the above object, according to the invention, there is provided a color image encoding apparatus comprising:

a) input means for inputting a plurality of color component data;

b) a plurality of encoding means for encoding the color component data which were input by the input means by different methods in accordance with the presence or absence of an edge; and c) output means for outputting the color component data which was encoded by the encoding means.

The above and other objects, operations, and advantages of the present invention will become apparent from the following detailed description and the appended claims with reference to the accompanying drawings.

BRIEF DESCRIPTION OF THE DRAWINGS

FIG. 3 is a diagram showing a block division of an input image;

FIG. 4 is a diagram showing a block pattern of a natural image portion;

FIG. 5 is a diagram showing a block pattern of a character portion;

FIG. 6 is a diagram showing a block pattern of an input image;

FIG. 7 is a diagram showing an example of a quantization table;

FIG. 8 is a diagram showing an example of DCT transformation coefficients;

FIG. 9 is a diagram showing an example of DCT quantization data;

FIG. 10 is a diagram showing an example of DCT decode data;

FIGS. 13, 14A, 14B, 15A, and 15B are diagrams for explaining other embodiments.

DETAILED DESCRIPTION OF THE PREFERRED EMBODIMENTS

Preferred embodiments of the invention will be described hereinbelow with reference to the drawings.

Embodiment 1

According to the first embodiment of the invention, means for classifying an image to be encoded to a natural image (flat) portion and a character (edge) portion in accordance with the characters of the image is provided and the portion which is classified as a character portion is first encoded by a BTC (block truncation coding) so as to raise a resolution. Then, a difference between the original image and the reconstructed image by the BTC is calculated and is DCT (discrete cosine transform) encoded so as to raise a gradation. As mentioned above, since the strong edge portion serving as a generation source of the ringing has already been eliminated by the first BTC encoding, a character of a high quality can be reproduced.

Figure 1:
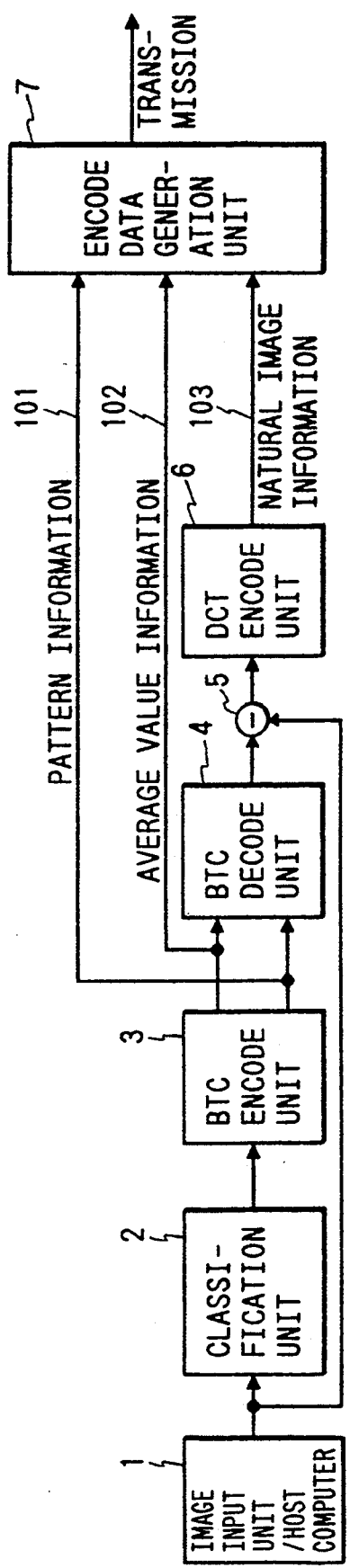
FIG. 1 is a block diagram of an encode unit in the first embodiment of the present invention.

FIG. 1 is a diagram showing a construction of an encode unit of the first embodiment of the invention. Reference numeral 1 denotes an image input unit such as image reading means for scanning an original and converting into image data every pixel, host computer for inputting image data, or the like. Reference numeral 2 denotes a classification unit for classifying the input image data to a character portion or a natural image portion; 3 a BTC encode unit for encoding using the BTC; 4 a BTC decode unit; 5 a differentiator for calculating a difference between the input image and the BTC decode image; 6 a DCT encode unit for executing the DCT to the difference data and quantizing transformation coefficients and executing a Huffman encoding; and 7 an encode data generation unit.

In the above construction, input image data which was input by the image input unit 1 such as an image scanner comprising a CCD line sensor or the like is discriminated by the classification unit 2 to see if it relates to the character portion or not every block in accordance with the presence or absence of an edge. Such a discrimination is performed by the block of a unit basis of $N \times M$ pixels (M and N are arbitrary integers: explanation will now be made here on the assumption that $N=M=4$).

Assuming that a density of the pixels in the block is set to $X_{ij}$ ($i=1, \ldots, 4, j=1, \ldots, 4$), an average value $$\overline{X} = \left( \sum_{i=1}^{4} \sum_{j=1}^{4} x_{ij} \right)/16$$

is first obtained. Further, among $x_{ij}$, an average $P_1$ of the pixels whose values are equal to or larger than $\overline{X}$ and its standard deviation $a_1$ and an average $P_2$ of the pixels whose values are smaller than $\overline{X}$ and its standard deviation $a_2$ are obtained (it is assumed that the image data consists of eight bits).

It is determined that the block which satisfies the following relational equations is a character portion.

$$P_1 - P_2 \geq L \; T_1 \text{ and } a_1 < T_2 \text{ and } a_2 < T_3$$

It is also assumed that the block which does not satisfy the above relational equations is a natural image portion. Although threshold values have been set such that $T_1=100$ and $T_2=T_3=30$ in the embodiment, they are not limited to the above values. By providing the threshold values $T_1$, $T_2$, and $T_3$, particularly, the character portion in the edge portion can be accurately discriminated.

As a method of discriminating the character portion, it is also possible to use other well-known methods such as method whereby a spatial frequency filter for extracting an edge is used, method based on a difference between the maximum and minimum values of the pixels in the block, and the like.

Then, with respect to the block which was determined to be a character portion by the classification unit 2, such a character pattern is expressed by the data of one bit per pixel and the average values $P_1$ and $P_2$ are encoded by the BTC encode unit 3.

The above processing state will now be descriminated with reference to FIG. 3. Assuming that A indicates a block of a natural image and B denotes a block of a character, as shown in FIG. 4, all of the pixels in the portion A are set to 0. In the portion of B, the pixels whose values are larger than $$\left( \frac{P_1 + P_2}{2} \right)$$

are set to 1 and the other pixels are set to 0 (for instance, as shown in FIG. 5). By executing the above processes to the whole input image, all of the pixels other than the character portion are set to 0 and only the character pattern can be left (FIG. 6). The whole pattern data is encoded by a coding method of MH, MR, or MMR or by other entropy coding methods, so that a signal 101 indicative of the pattern information is obtained.

On the other hand, the average values $P_1$ and $P_2$ of the character block are also Huffman encoded and a signal 102 indicative of average value information is derived.

As mentioned above, with respect to the pattern information and the average value information, by using a reversible encoding, the resolution is raised and the ringing occurring in the periphery of the character portion can be eliminated.

On the other hand, the BTC decode unit 4 reconstructs the image by decoding on the basis of the pattern information signal 101 and the average value information signal 102 and reproduces only the character (edge) block. The differentiator 5 calculates a difference between the image of the character block which was reconstructed and the input image which was input from the image input unit 1. The difference output is encoded by the DCT encode unit 6 on the basis of an encoding method such as an ADCT (adaptive discrete cosine transform) or the like.

The DCT encode unit 6 first executes the two-dimensional DCT every block comprising 4 pixels $\times$ 4 pixels, thereby obtaining transformation coefficients as shown in, for instance, FIG. 8. Each of the transformation coefficients obtained is quantized by a quantization table as shown in FIG. 7, so that quantization data as shown in FIG. 9 is obtained. Practically speaking, each of the transformation coefficients of FIG. 8 is divided by the corresponding component of the quantization table of FIG. 7 on the matrix and the figures below a decimal point are omitted, so that the quantization data shown in FIG. 9 is obtained. The DCT code is constructed by zigzag scanning the coefficients which were quantized as shown in FIG. 9 and Huffman encoding, so that a signal 103 indicative of natural image information is derived. As mentioned above, for the natural image information, a compression ratio is raised by the irreversible encoding and an encoding efficiency can be improved. The cause of the ringing which caused the problem hitherto is based on the cutting of the high frequency component by the quantization. However, according to the invention, the character portion having a large amount of high frequency component is encoded by the BTC and the high frequency portion which is encoded by the DCT encoding portion is reduced, thereby clearing such a problem.

That is, by encoding the edge portion and the other portions by respectively using the optimum encoding methods in accordance with the detection of the edge portion (character portion), a deterioration in image quality can be prevented.

First, the natural image information signal 103 of an amount of one picture plane of the input image is first transmitted from the encode data generation unit 7. Then, with respect to the amount of one picture plane of the input image, classification information of one bit indicating whether each block is a character block or not is transmitted by the MMR or the like. Finally, the pattern information signal 101 and the average value information signal 102 are transmitted. A discrimination regarding the character block is performed by checking whether the signals 101 and 102 have been input to the encode data generation unit 7 or not. The result of the discrimination is held in an internal memory of the encode data generation unit 7 by an amount of one picture plane of the input image.

That is, the encode data generation unit 7 has the memory for storing the natural image information signal 103, classification information, pattern information signal 101, and average value information signal 102. The memory has a capacity to store at least the classification information, pattern information signal 101, and average value information signal 102 as much as one picture plane.

On the other hand, as a storage device such as an image file or the like, memory means such as optical disk, magnetic disk, hard disk, or the like can be used to store the data which is sent from the encode data generation unit 7 by an amount of a plurality of picture planes.

The transmitting order of the above various information is not limited to the order mentioned above but a signal indicating whether the input image data relates to the character portion or not can be also first transmitted.

Figure 2:
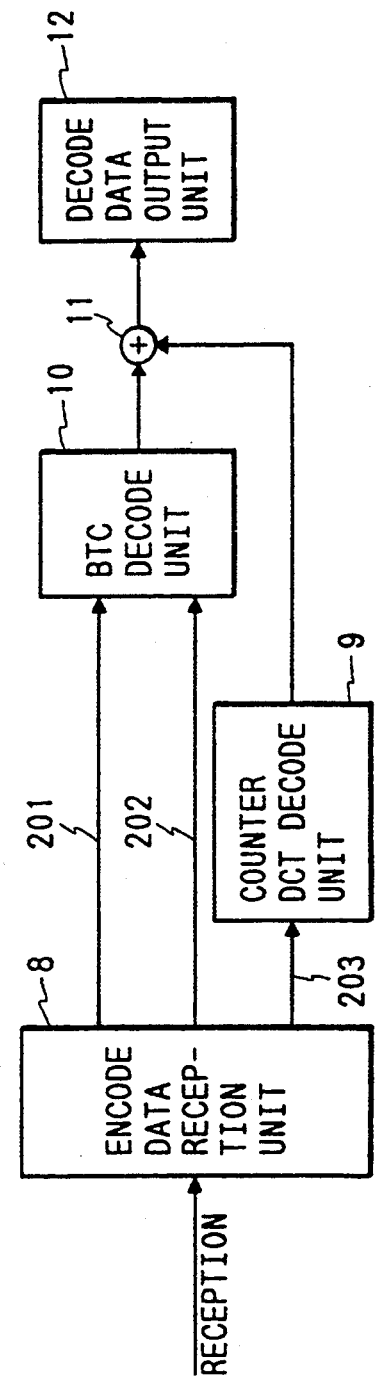
FIG. 2 is a block diagram of a decode unit in the first embodiment of the invention.

FIG. 2 is a block diagram of a portion to decode the received encode data. The transmitted encode data is received by an encode data reception unit 8 and stored into an internal memory. Then, a BTC decode unit 10 decodes the block of the character portion by using a pattern information signal 201 from the encode data reception unit 8 and an information signal 202 of the average values $P_1$ and $P_2$ of each block. On the basis of the decoded block, a character image is reconstructed. Namely, when the pattern information was reconstructed as shown in FIG. 6, "0" in the character portion (portion in which "1" exists in the block) is replaced by $P_2$ and "1" is replaced by $P_1$.

A counter DCT decode unit 9 decodes quantized transformation coefficient information 203 and executes a counter quantization by using the quantization table (FIG. 7 (the same table as that used upon quantization)) in accordance with the procedure which is substantially opposite to the procedure upon quantization, thereby obtaining transformation coefficients (FIG. 10). That is, each component of the quantization table of FIG. 7 is multiplied to the quantization data of FIG. 9, thereby obtaining the transformation coefficients of FIG. 10. Then, a two-dimensional counter DCT is executed. The image obtained and the image which was output from the BTC decode unit 10 are added by an adder 11, thereby obtaining the final decode data. An image is output by a decode data output unit 12 such as laser beam printer for forming a latent image onto a photosensitive drum and forming a visible image by using a toner, ink jet printer, thermal printer, or the like. An image may be also formed onto a display.

According to the embodiment, as mentioned above, the means for classifying an image to be encoded to a natural image (flat) portion and a character (edge) portion is provided. The portion which was classified to the character portion is first encoded by the BTC. A difference between the original image and the reconstructed image by the BTC is then calculated and DCT encoded. Thus, a strong edge portion as a generation source of the ringing has already been eliminated. Therefore, a character of a high quality can be reproduced.

Second Embodiment

Figure 11:
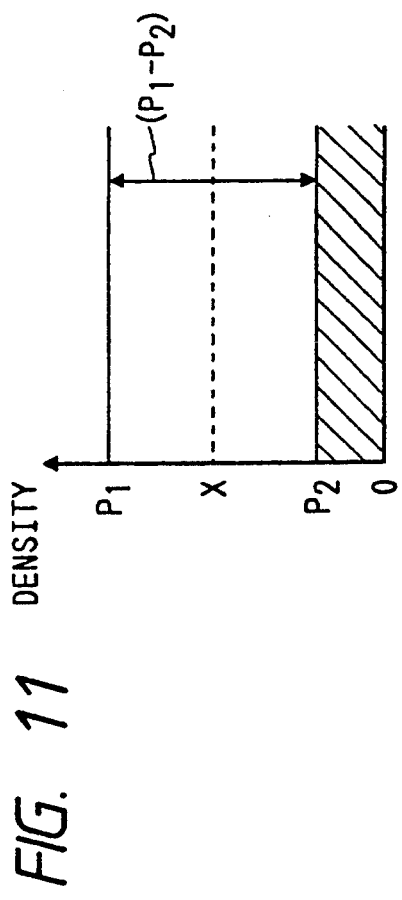
FIG. 11 is a diagram for explaining the principle of the second embodiment of the invention.

In the above first embodiment, in the BTC, both of the average value $P_1$ of the pixels whose values are equal to or larger than the intrablock average value X and the average value $P_2$ of the pixels whose values are less than X are Huffman encoded and transmitted. However, in the second embodiment, as shown in FIG. 11, a difference value $P_1-P_2$ of $P_1$ and $P_2$ is Huffman encoded.

As mentioned above, with respect to the block which was determined to be a character portion, by encoding only the pattern data of such a block and the difference value $P_1-P_2$, the encoding efficiency in the BTC can be remarkably improved.

On the other hand, the high frequency component of a character block can be almost preferably reconstructed by the encoding by the BTC by using only the difference value $P_1-P_2$. However, the data of the hatched portion in FIG. 11 cannot be reconstructed by using only the BTC.

Therefore, in the encoding apparatus of the embodiment, the encode data by the BTC is again decoded and a difference between the resultant data and the original image is calculated and is DCT encoded. Thus, the data of the hatched portion in FIG. 11 can be encoded by the DCT. Therefore, according to the second embodiment, the encoding efficiency when the character portion is block encoded can be improved. On the other hand, the data which is not used for block encoding is followed by the DCT encoding. Consequently, a deterioration in image quality which occurs due to the improvement of the encoding efficiency can be prevented.

A construction of the encoding apparatus of the embodiment will now be described hereinbelow.

The construction of the second embodiment is also fundamentally similar to that of the embodiment 1.

Figure 12:
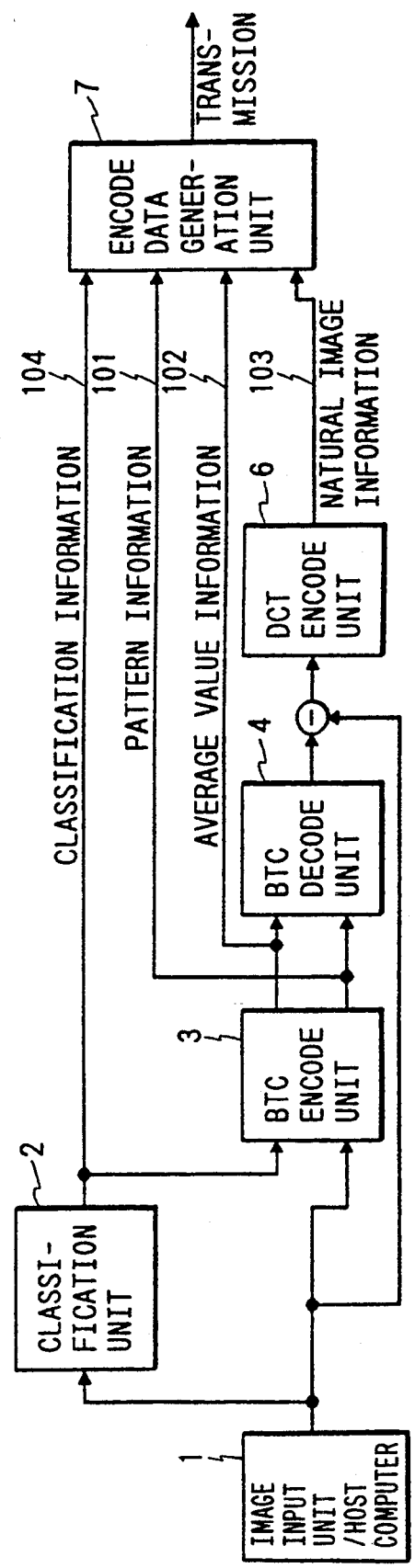
FIG. 12 is a block diagram of an encode unit in the second embodiment of the invention.

FIG. 12 is a diagram showing a construction of an encode unit in the second mebodiment of the invention. Reference numeral 1 denotes the image input unit; 2 indicates the classification unit for classifying whether the input image data relates to a character portion or a natural image portion; 3 the BTC encode unit for encoding by using the BTC; 4 the BTC decode unit; 5 the differentiator for calculating a difference between the input image and the BTC decode image; 6 the DCT encode unit for executing the DCT to the difference data and quantizing the transformation coefficients and executing the Huffman encoding; and 7 the encode data generation unit.

In the above construction, the input image data which was input by the image input unit 1 such as a CCD sensor or the like is discriminated by the classification unit 2 to see if it relates to a character portion or not every block. Such a discrimination is performed by the block on a unit basis of N×M pixels (M and N are arbitrary integers: explanation will now be made on the assumption that N=M=4 here).

Assuming that a density of pixels in the block is set to $x_{ij}$ (i=1, ..., 4; j=1, ..., 4), the average value $$\overline{X} = \left( \sum_{i=1}^{4} \sum_{j=1}^{4} x_{ij} \right)/16$$

is first obtained. Further, among $x_{ij}$, the average $P_1$ of the pixels whose values are equal to or larger than $\overline{X}$ and its standard deviation $a_1$ and the average $P_2$ of the pixels whose values are smaller than $\overline{X}$ and its standard deviation $a_2$ are obtained (it is assumed that the image data comprises eight bits).

The block which satisfies the following relational equations is determined to be a character portion.

$$P_1 - P_2 \geq T_1 \text{ and } a_1 < T_2 \text{ and } a_2 < T_3$$

Although the threshold values have been set such that $T_1=100$ and $T_2=T_3=30$, the invention is not limited to the above values. Classification information 104 of one bit of each block is directly sent to the encode data generation unit 7. The classification information of one picture plane of the input image is stored into an internal memory.

With respect to the block which was determined to be a character portion by the classification unit 2, the block pattern is expressed by one bit and the difference value $P_1-P_2$ of the average values $P_1$ and $P_2$ is encoded in the BTC encode unit 3.

The above processing operations will now be described with reference to FIG. 3. Now, assuming that A indicates the natural image portion and B represents the character portion, all of the pixels in the portion A are set to 0 as shown in FIG. 4. The pixels whose values are larger than $$\left( \frac{P_1 + P_2}{2} \right)$$

in the portion B are set to 1 and the other pixels are set to 0 (for instance, as shown in FIG. 5). By executing the above processes to the whole input image, all of the pixels other than the character portion are set to 0 and only the character pattern can be left (FIG. 6). The whole pattern information is encoded by the MMR or entropy encoding, so that the signal 101 is obtained. On the other hand, the difference value $P_1-P_2$ of the character block is also Huffman encoded, so that the signal 102 is derived.

In the BTC decode unit 4, an image is reconstructed by the signals 101 and 102 and only a character block is reproduced. The differentiator 5 calculates a difference between the reproduced image and the input image. The difference output is encoded by the DCT encode unit 6.

The DCT encode unit 6 first executes the two-dimensional DCT to 4×4 blocks, thereby obtaining the transformation coefficients as shown in, for example, FIG. 8.

Each of the transformation coefficients obtained is quantized by the quantization table as shown in FIG. 7, so that the quantization data as shown in FIG. 9 is obtained. Practically speaking, each of the transformation coefficients of FIG. 8 is divided by the corresponding component of the quantization table of FIG. 7 on the matrix and the figures below the decimal point are omitted. Thus, the quantization data shown in FIG. 9 is derived. The DCT code is constructed by zigzag scanning the coefficients which were quantized as shown in FIG. 9 and Huffman encoding, so that the signal 103 is derived. The cause of the ringing which caused a problem hitherto is based on the cutting of the high frequency components by the quantization. However, according to the invention, the character portion having a large high frequency component is encoded by the BTC and the high frequency portion is reduced, thereby clearing the above problem.

A block diagram of the portion to decode the received encode data in FIG. 2 is similar to that in the case of the first embodiment. That is, in the BTC decode unit 10, first, the block of the character portion is decoded by using the pattern information signal 201 and the information signal 202 of the difference value $P_1-P_2$ of the average values $P_1$ and $P_2$ of each block which are output from the encode data reception unit 8. A character image is reconstructed on the basis of the decoded block. That is, when the pattern information is reconstructed as shown in FIG. 6, 0 in the character portion (portion in which 1 exists in the block) is set to 0 and 1 is replaced by $P_1-P_2$. On the other hand, in the counter DCT decode unit 9, the quantized transformation coefficient information 203 is decoded and executes the count quantization by using the quantization table (FIG. 7 (the same table as that used upon quantization)) in accordance with a procedure which is quite opposite to the procedure upon quantization, thereby obtaining the transformation coefficients (FIG. 10). That is, each component of the quantization table of FIG. 7 is multiplied to the quantization data of FIG. 9, thereby obtaining the transformation coefficients of FIG. 10. Then, a two-dimensional counter DCT is executed and the resultant image and the image which was output from the BTC decode unit 10 are added by the adder 11, thereby obtaining the final decode data. An image is output by the decode data output unit 12.

As mentioned above, according to the embodiment, the encoding efficiency in the block encoding of the character portion can be improved and a deterioration in image quality of the reproduction image can be prevented.

Other Embodiments

Although the above embodiments have been described with respect to a black and white multivalue image, the invention can be also applied to a color multivalue image. As a method of processing a color multivalue image, there can be mentioned a method whereby the invention is used with respect to each of the planes of R, G, and B, a method whereby the RGB data is converted into a color space such as YUV, L*a*b* or the like and the invention is used, or the like.

Figure 14B:
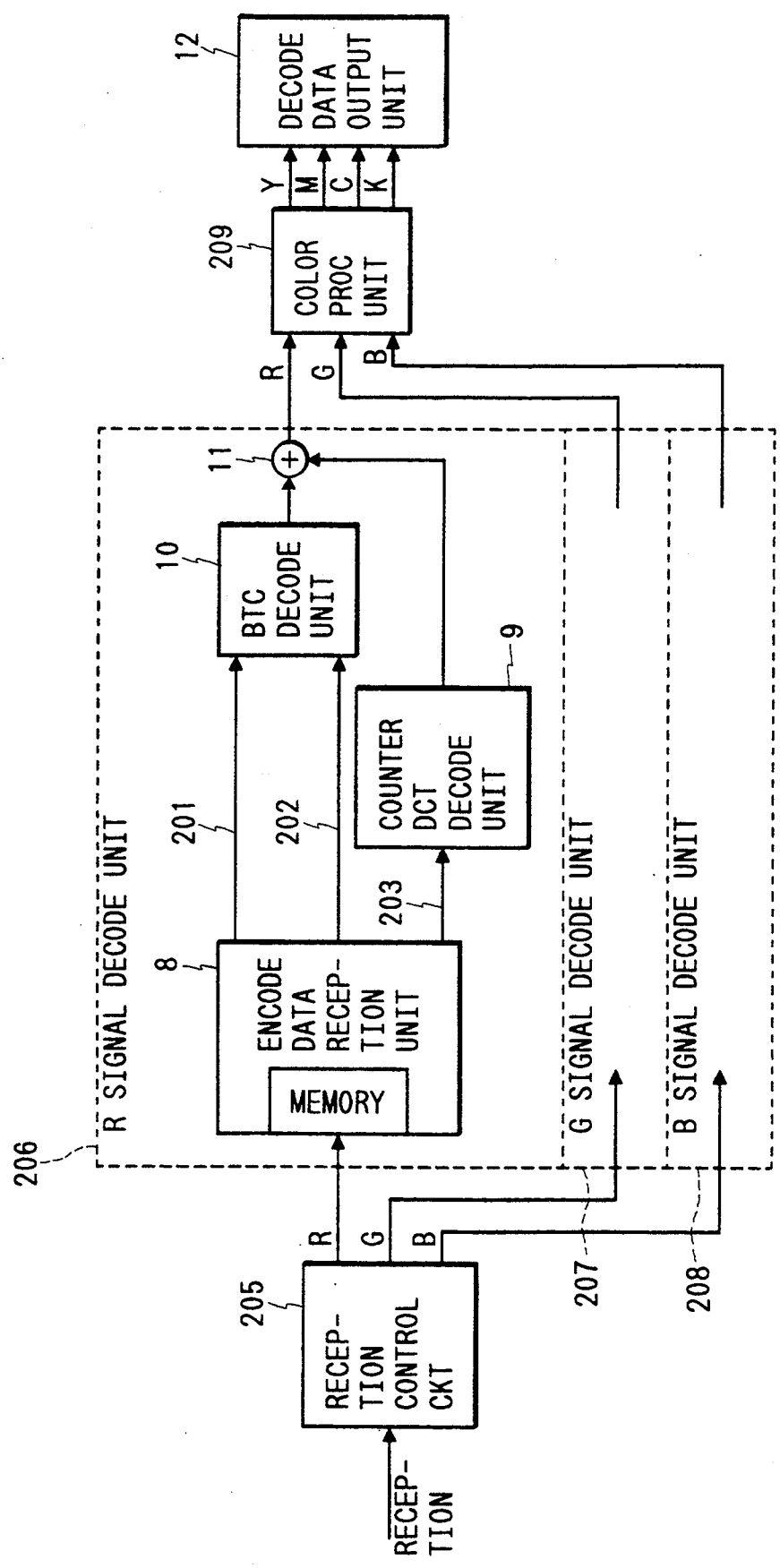

FIGS. 14A and 14B show an embodiment in the case where the invention was applied to the compression and transmission of a color multivalue image.

In FIG. 14A, reference numeral 1 dentoes the image input unit. In the embodiment, a flat head color image scanner which scans an image on an original base plate by three line sensors for R (red), G (green), and B (blue) and generates multivalue signals of R, G, and B every pixel is used as the image input unit 1. Reference numerals 201', 202', and 203' denote encode units for encoding the R, G and B signals, respectively. Each of the encode units is similar to that of the encode unit shown in FIG. 1. Reference numeral 204 denotes a transmission control circuit for controlling in a manner such that the data encoded by the encode units 201' to 203' are read out of the internal memory of the encode data generation unit 7 and are sequentially transmitted.

In FIG. 14B, reference numeral 205 denotes a reception control circuit for discriminating to which one of the R, G, and B data the received encode data relates, for selecting either one of an R signal decode unit 206, a G signal decode unit 207, and a B signal decode unit 208, and for transmitting the received encode data to the selected corresponding decode unit. The R, G, and B data can be discriminated by, for instance, adding a flag. A construction of each of the decode units 206 to 208 is similar to the construction of that shown in FIG. 1.

The multivalue R, G, and B data which were decoded by the decode units 206 to 208 are subjected to color processes such as logarithm conversion, masking, gamma correction, and the like by a color processing unit 209. The multivalue data of Y (yellow), M (magenta), C (cyan), and K (black) corresponding to recording agents are sent to the decode data output unit 12. The decode data output unit forms a visible image on the basis of the Y, M, C, and K data. An apparatus such as a printer to output a hard copy and an apparatus such as a display to output a soft copy can be used as the decode data output unit. In the case of displaying an image by the display apparatus, the R, G, and B data are directly output without executing the conversion into the Y, M, C, and K data by the color processing unit 209. As a printer, for instance, a printer of the electrophotographic type for forming a latent image onto a photosensitive drum and developing the latent image by using color toners of Y, M, C, and K can be used.

Figure 15A:
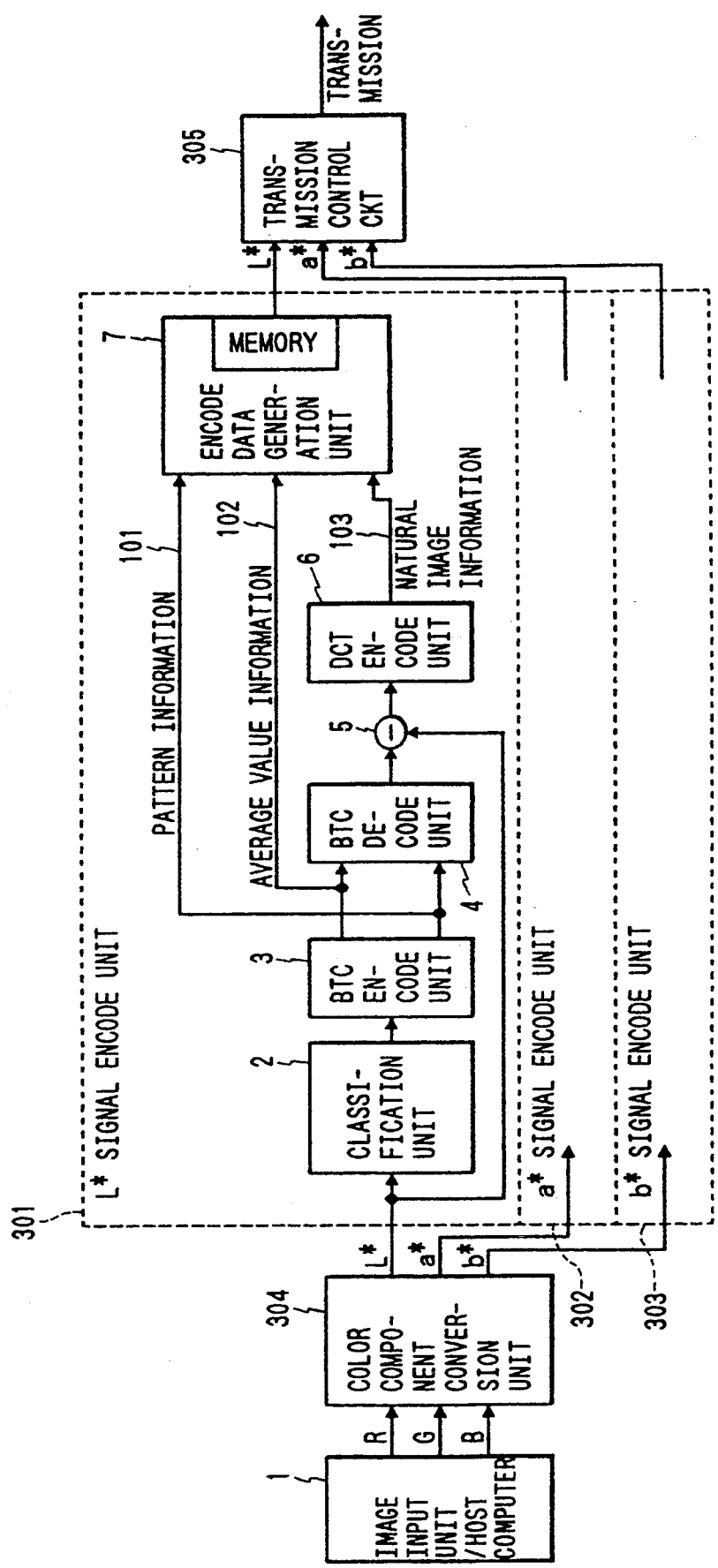
Figure 15B:
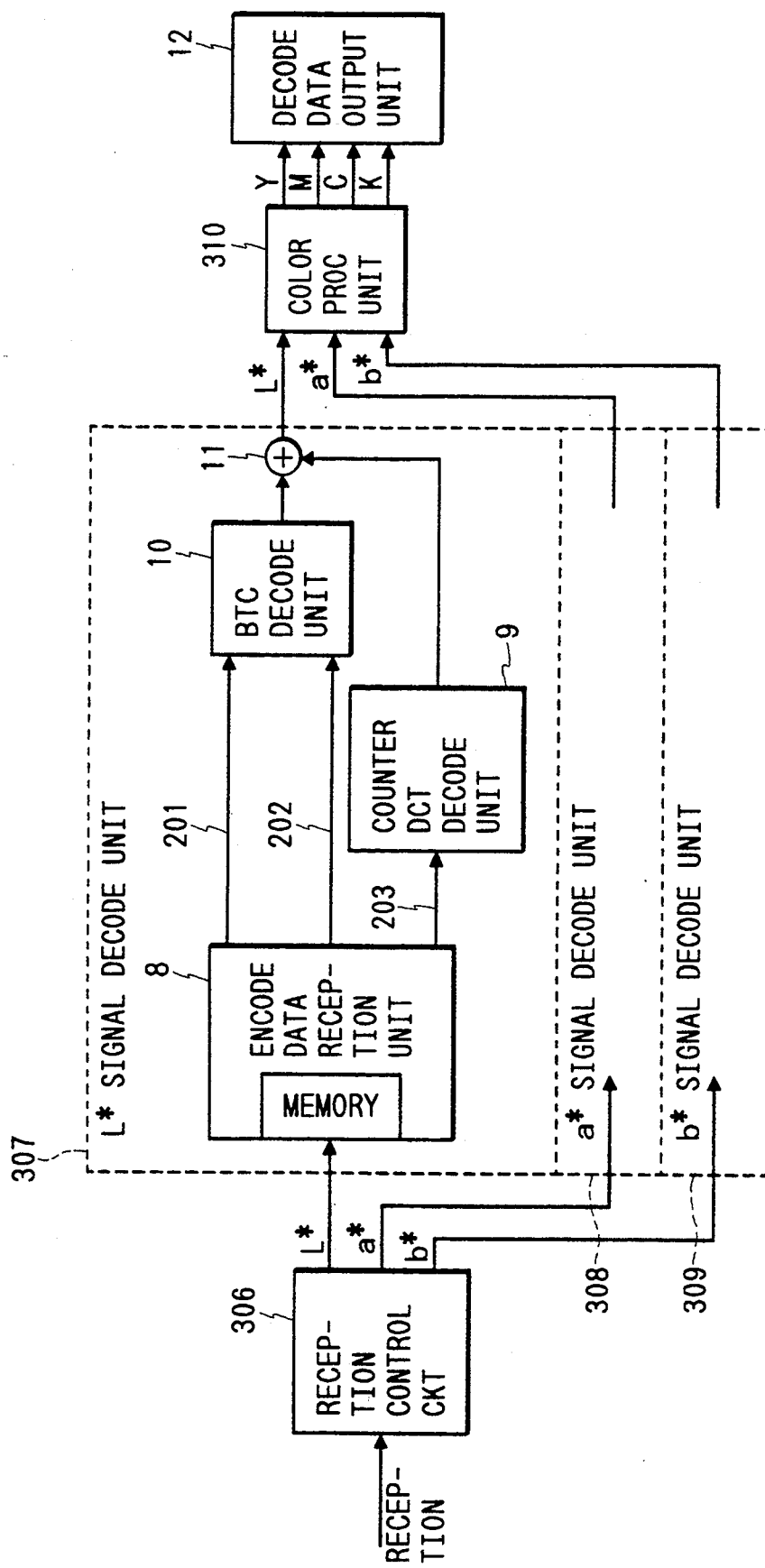

On the other hand, FIGS. 15A and 15B show an embodiment in the case where the function for the color component conversion was further added to the color encoding and decoding apparatuses in FIGS. 14A and 14B.

In FIG. 15A, a color component conversion unit 304 converts the input R, G, and B data into the color component data of L*, a*, and b*. L* denotes a luminance component and a* and b* indicate chromaticity components. Since the construction for converting the input color data into the luminance component and the chromaticity components has been used, a data amount of the chromaticity components can be further reduced as compared with that of the luminance component by using a nature such that a deterioration in chromaticity components is difficult to be recognized by the visual sense of human being. Since the other constructions are similar to those of FIG. 14A, their descriptions are omitted.

On the other hand, in the BTC encode unit 3, it is also possible to use a method whereby for the average values $P_1$ and $P_2$, a difference between $P_1$ and $P_2$ of the adjacent blocks is calculated and the Huffman coding or the entropy coding such as an arithmetic code or the like is used.

The transmission and reception of the encode data can be also executed in a lump every block with respect to the flag indicative of the character portion, pattern information 101, average value information 102, and natural image information 103.

The block encoding is not limited to the case of encoding the pattern information and the difference value information. For instance, the pattern information and the standard deviations can be also encoded.

In the invention, the difference between the reproduced image by the BTC and the input image has been DCT encoded. However, as shown in FIG. 12, the DCT encoding is not executed to the character portion but only the BTC encoding is executed and the portions other than the character portion can be also DCT encoded.

Figure 13:
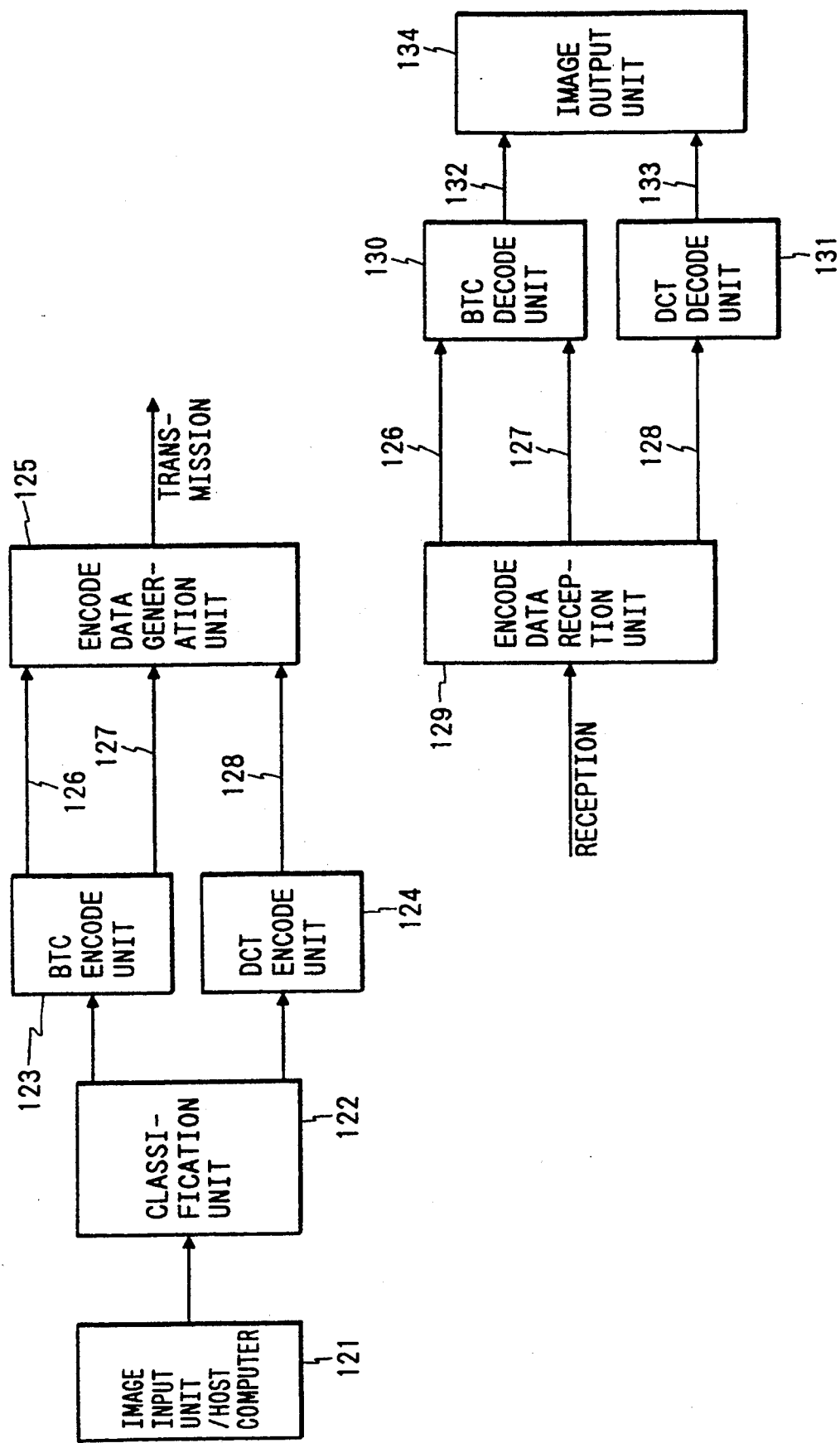

In FIG. 13, reference numeral 121 denotes image data which was input from the image input unit. A classification unit 122 discriminates whether the input block relates to an edge portion or not every block. The block which was determined to be the edge portion is encoded by a BTC encode unit 123. Pattern data 126 in the block and average value data $P_1$ and $P_2$ (127) are sent to an encode data generation unit 125. On the other hand, the block which was decided to be a portion other than the edge portion is quantized by a DCT encode unit 124 in a manner similar to the above. Quantization data 128 is sent to the encode data generation unit 125. In the encode data generation unit 125, the pattern data 126, average value data 127, and quantization data 128 are stored every block and encode data for transmission is formed. On the other hand, the decoding is executed in accordance with a procedure opposite to the encoding procedure. In the encode data which was received by an encode data reception unit 129, the BTC decoding is executed by using the pattern data 126 and average value data 127 by a BTC decode unit 130. The DCT decoding is performed by using the quantization data 128 by a DCT decode unit 131. An original image can be finally reconstructed in an internal memory of an image output unit 134 by using BTC decode data 132 of the edge portion and the DCT decode data of the natural image portion.

FIGS. 15B shows an apparatus on the reception side and a construction other than the color processing unit 310 is similar to that in FIG. 14B. The color processing unit 310 converts the luminance data L* and the chromaticity data a* and b* into the Y, M, C, and K data.

As described above, by BTC encoding the character portion having a large high frequency component and calculating a difference between the BTC reconstructed image and the input image, the high frequency component can be reduced. Therefore, when the character portion was DCT encoded, no ringing occurs. The character portion of a high quality can be reproduced as compared with the conventional apparatus.

What is claimed is:

1. An image encoding apparatus comprising:
   a) input means for inputting multi-level data for each pixel of an image;
   b) discriminating means for discriminating whether the input image data represents an edge portion or not;
   c) first encoding means for encoding the image data discriminated to be the edge portion by said discriminating means as binary image data by using a first encoding method, which is suitable for encoding the binary image data;

d) second encoding means for encoding the image data outside of the edge portion as multi-value image data for each pixel on which binarization is not performed by using a second encoding method different from the first encoding method, the second encoding method being suitable for encoding the multi-value image data; and e) output means for outputting the image data encoded by said first and second encoding means.

2. An apparatus according to claim 1, wherein the input means is an image reading apparatus for scanning an original and converting into image data of every pixel.

3. An apparatus according to claim 1, wherein the input means is a host computer.

4. An apparatus according to claim 1, wherein the discriminating means discriminates whether a block which is constructed by a plurality of pixels includes an edge or not every said block.

5. An apparatus according to claim 1, wherein said first encoding means encodes by using a first encoding method so as to raise a resolution for the data which was determined to be the edge data in the input image data and said second encoding means encodes by using a second encoding method different from the first encoding method so as to raise a gradation for the data which was determined to be the data other than edge data in the input image data.

6. An apparatus according to claim 5, wherein the first encoding method is a block encoding method.

7. An apparatus according to claim 5, wherein the second encoding method is an encoding method using an orthogonal transformation.

8. An apparatus according to claim 7, wherein the orthogonal transformation is a discrete cosine transformation.

9. An apparatus according to claim 1, further having memory means for storing the encoded data.

10. An apparatus according to claim 1, further having transmitting means for transmitting the encoded data.

11. An image encoding method comprising:
a) an input step of inputting multi-level image data for each pixel of an image;
b) a discriminating step of discriminating whether the input image data represents an edge portion or not;
c) a first encoding step of encoding the image data discriminated to be the edge portion in said discriminating step as binary image data by using a first encoding method, which is suitable for encoding the binary image data;
d) a second encoding step of encoding the image data outside of the edge portion as multi-value image data for each pixel on which binarization is not performed by using a second encoding method different from the first encoding method, the second encoding method being suitable for encoding the multi-value image data; and
e) an output step for outputting the image data which was encoded by said first and second encoding steps.

12. A method according to claim 11, wherein in the inputting step, the image data is input by using an image reading apparatus for scanning an original and converting into image data of every pixel.

13. A method according to claim 11, wherein in the inputting step, the image data from a host computer is input.

14. A method according to claim 11, wherein in the encoding step, a check is made to see if a block which is constructed by a plurality of pixels includes an edge or not every said block.

15. A method according to claim 11, wherein in said first encoding step, the data which was encoded by a first encoding method so as to raise a resolution and, in said second encoding step, the data which was determined to be the data other than the edge data in the input image data is encoded by a second encoding method different from the first encoding method so as to raise a gradation.

16. A method according to claim 15, wherein the first encoding method is a block encoding method.

17. A method according to claim 15, wherein the second encoding method is an encoding method using an orthogonal transformation.

18. A method according to claim 17, wherein the orthogonal transformation is a discrete cosine transformation.

19. A method according to claim 11, further having the step of storing the encode data which was encoded by the encoding step.

20. A method according to claim 11, further having the transmitting step of transmitting the data which was output by the outputting step.

21. An image processing system comprising:
a) input means for inputting multi-value data for each pixel of an image;
b) discriminating means for discriminating whether the input image data represents an edge portion or not;
c) first encoding means for encoding the image data discriminated to be the edge portion by said discriminating means as binary image data by using a first encoding method, which is suitable for encoding the binary image data;
d) second encoding means for encoding the image data outside of the edge portion as multi-value image data for each pixel on which binarization is not performed by using a second encoding method different from the first encoding method, the second encoding method being suitable for encoding the multi-value image data;
e) memory means for storing the image data which is encoded by said first and second encoding means;
f) decoding means for decoding the image data stored in said memory means; and
g) output means for outputting the image data which was decoded by said decoding means.

22. A system according to claim 21, wherein the input means is an image reading apparatus for scanning an original and converting into image data of every pixel.

23. A system according to claim 21, wherein the input means is a host computer.

24. A system according to claim 21, further comprising discriminating means for discriminating whether a block which is constructed by a plurality of pixels includes an edge or not every said block.

25. A system according to claim 21, wherein said first encoding means encodes by a first encoding method so as to raise a resolution for the data which was determined to be the edge data in the input image data and said second encoding means encodes by a second encoding method different from the first encoding method so as to raise a gradation for the data which was determined to be the data other than edge data in the input image data.

26. A system according to claim 25, wherein the first encoding method is a block encoding method.

27. A system according to claim 25, wherein the second encoding method is an encoding method using an orthogonal transformation.

28. A system according to claim 27, wherein the orthogonal transformation is a discrete cosine transformation.

29. A system according to claim 21, wherein the output means has image forming means for forming a visible image on the basis of the decoded image data.

30. A system according to claim 29, wherein the image forming means includes a photosensitive material.

31. A system according to claim 29, wherein the image forming means includes a display.

32. An image encoding apparatus comprising:
a) input means for inputting multi-value image data for each pixel of an image;
b) discriminating means for discriminating whether the input image data represents an edge portion or not;
c) first encoding means for encoding the image data discriminated to be the edge portion by said discriminating means as binary image data by using a first encoding method, which is suitable for encoding the binary image data;
d) decoding means for decoding a code representing the encoded edge portion encoded by said first encoding means;
e) eliminating means for eliminating the image data decoded by said decoding means from the input image data and generating difference data;
f) second encoding means for encoding the difference data generated by said eliminating means as multi-value image data for each pixel on which binarization is not performed by using a second encoding method different from the first encoding method, the second encoding method being suitable for encoding the multi-value image data; and
g) output means for outputting the image data encoded by said first and second encoding means.

33. An apparatus according to claim 32, wherein the input means is an image reading apparatus for scanning an original and converting into image data of every pixel.

34. An apparatus according to claim 32, wherein the input means is a host computer.

35. An apparatus according to claim 32, wherein the first encoding method is a block encoding method.

36. An apparatus according to claim 32, wherein the second encoding method is an encoding method using an orthogonal transformation.

37. An apparatus according to claim 32, further having memory means for storing the encoded data.

38. An apparatus according to claim 32, further having transmitting means for transmitting the encoded data.

39. A color image encoding apparatus comprising:
a) input means for inputting image data composed of a plurality of color component data for each pixel of an image;
b) discriminating means for discriminating whether the input image data represents an edge portion or not for each color component;
c) first encoding means for encoding the image data discriminated to be the edge portion by said discriminating means as binary image data by using a first encoding method for each color component, the first encoding method being suitable for encoding the binary image data;
d) eliminating means for eliminating the image data discriminated to be the edge portion from the input image data and generating difference data for each color component;
e) second encoding means for encoding the difference data generated by said eliminating means as multi-value image data for each pixel on which binarization is not performed by using a second encoding method different from the first encoding method for each color component, the second encoding method being suitable for encoding the multi-value image data; and
f) output means for outputting the image data encoded by said first and second encoding means.

40. An apparatus according to claim 39, wherein the input means is an image reading apparatus for scanning an original and converting into image data of every pixel.

41. An apparatus according to claim 39, wherein the input means is a host computer.

42. An apparatus according to claim 39, further comprising discriminating means for discriminating whether a block which is constructed by a plurality of pixels includes an edge or not every said block.

43. An apparatus according to claim 39, wherein said first encoding means encodes by a first encoding method so as to raise a resolution for the data which was determined to be the edge data in the input image data and said second encoding means encodes by a second encoding method different from the first encoding method so as to raise a gradation for the data which was determined to be the data other than edge data in the input image data.

44. An apparatus according to claim 43, wherein the first encoding method is a block encoding method.

45. An apparatus according to claim 43, wherein the second encoding method is an encoding method using an orthogonal transformation.

46. An apparatus according to claim 39, further having memory means for storing the encoded data.

47. An apparatus according to claim 39, further having transmitting means for transmitting the encoded data.

* * * * *